Oct. 29, 1929.   I. BLOCK   1,733,681
PNEUMATIC TIRE ARMOR
Filed Dec. 21, 1927   3 Sheets-Sheet 1
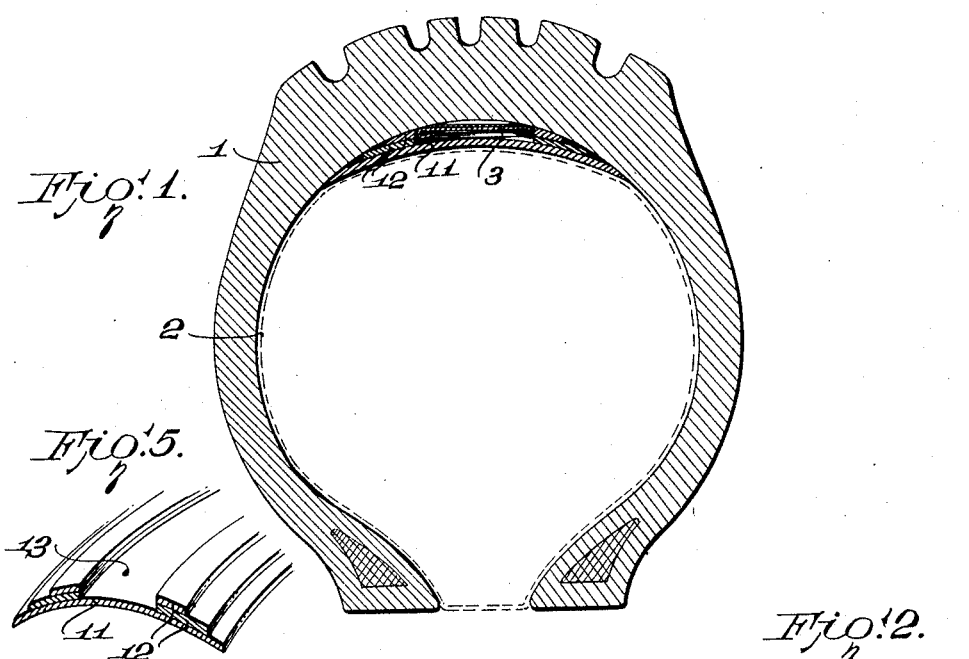
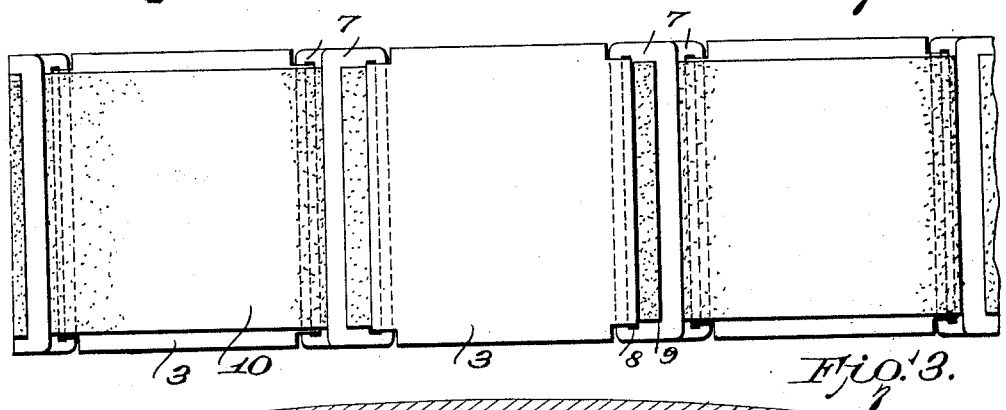
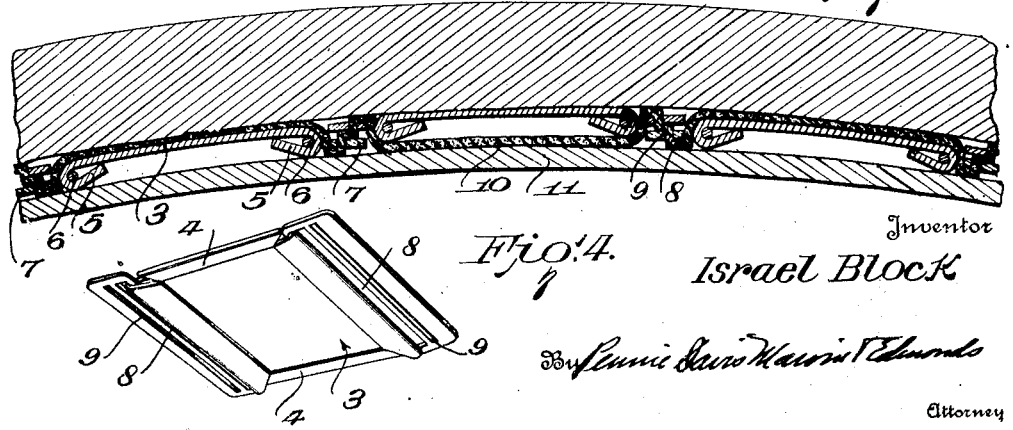
Inventor
Israel Block Oct. 29, 1929.     I. BLOCK     1,733,681
PNEUMATIC TIRE ARMOR
Filed Dec. 21, 1927     3 Sheets-Sheet 2
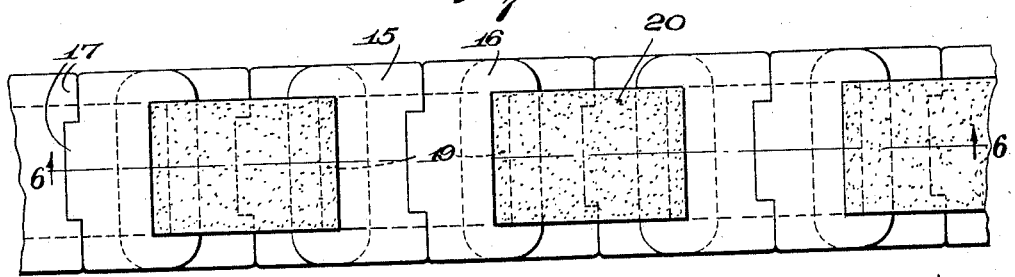
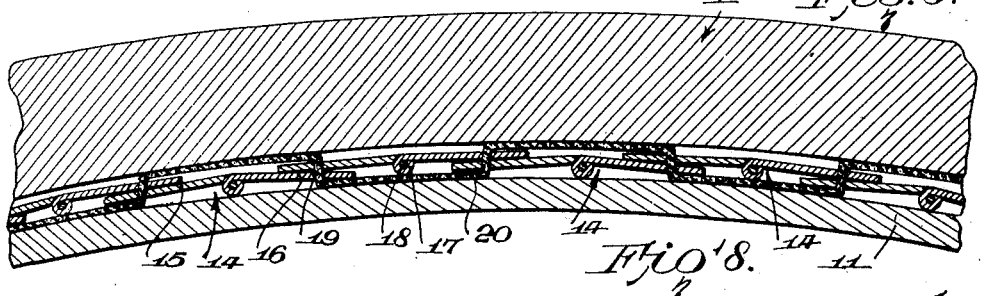
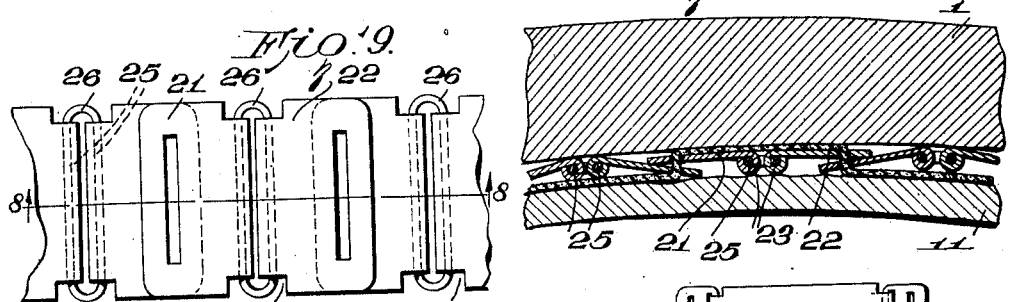
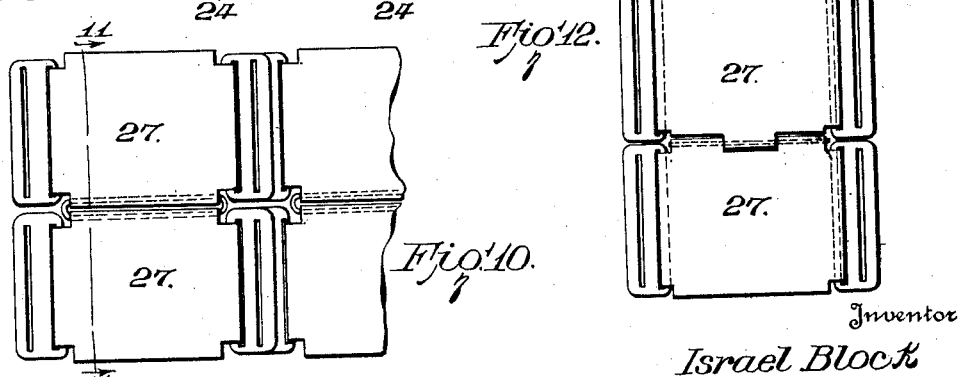
Inventor
Israel Block Oct. 29, 1929.  I. BLOCK  1,733,681
PNEUMATIC TIRE ARMOR
Filed Dec. 21, 1927  3 Sheets-Sheet 3
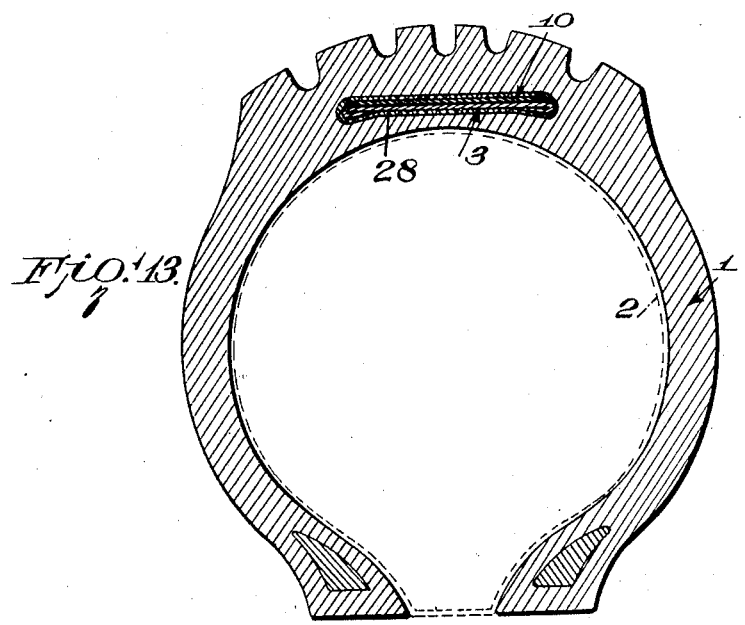
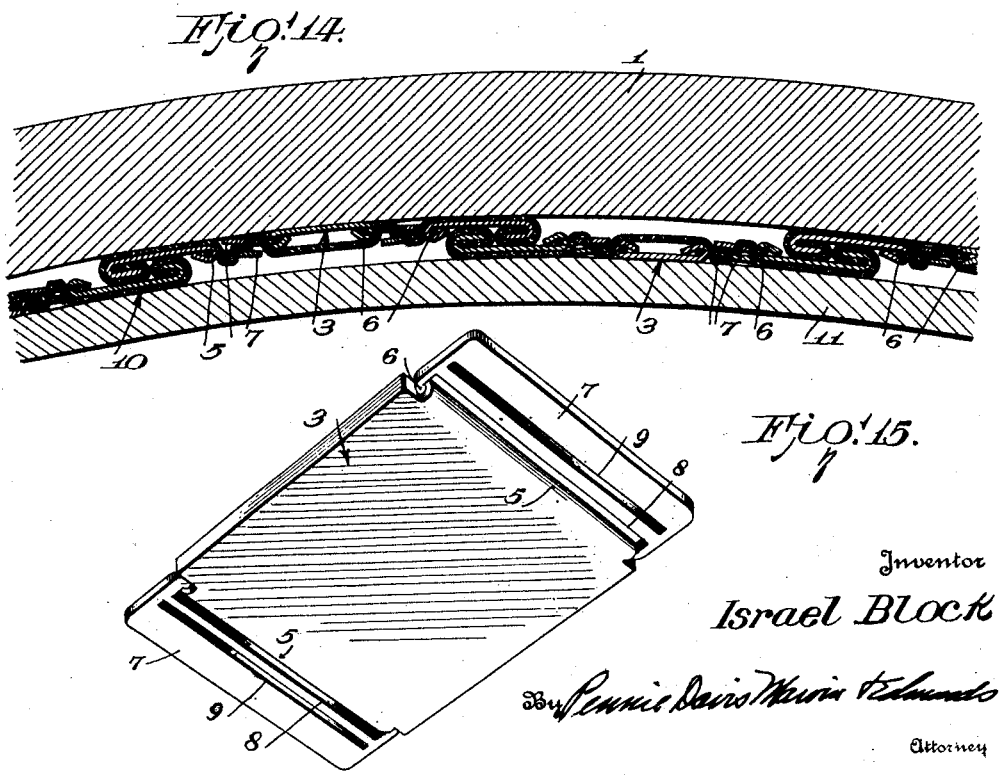

Patented Oct. 29, 1929

1,733,681

UNITED STATES PATENT OFFICE

ISRAEL BLOCK, OF BALTIMORE, MARYLAND

PNEUMATIC-TIRE ARMOR

Application filed December 21, 1927. Serial No. 241,629.

This invention relates to protectors or armors for pneumatic vehicle tires and an object is to provide a suitable protector which may be either built into the tire casing during the manufacture thereof, or which may comprise a separate unit or units which may be manufactured independently and sold as an accessory to be used in conjunction with pneumatic tires of usual construction, and which will, in either case, protect the inner tube from punctures and the tire casing from blowouts, without lessening the resiliency of the tire.

Various ways have heretofore been proposed to render pneumatic tires substantially puncture and blow-out proof, but commercially these have usually been rejected because they materially lessen the resiliency of the tire, or else are of such construction as to cause abrading or cutting of the pneumatic tube or casing.

The present invention overcomes the above defects by providing a plurality of protective plates which are arranged upon a flexible band in such a way as to have movement relative to each other when the tire passes over stones or other obstructions in the road. They are also arranged upon the flexible band so that the band protects the tire casing against cuts or abrasions, whether they are embedded therein, or interposed between the tire casing and inner tube. When the armor is interposed between the casing and inner tube, the latter is further protected by an improved form of liner which is interposed between the inner tube and the armor.

The invention also includes an arrangement of units whereby the armor may be built up for different size tires by simply using a greater or less number of units.

The invention will be further described by reference to the accompanying drawings, but it will be understood that this more detailed description and illustration is intended as an exemplification of the invention and that the invention is not limited thereto.

Figure 1 is a transverse sectional view of a pneumatic tire showing my improved armor interposed between the tire casing and the inner tube.

Fig. 2 is a plan view of a portion of the armor shown in Fig. 1,

Fig. 3 is a circumferential sectional view through a part of the tire shown in Fig. 1, Fig. 4 is a detail view of one of the units shown in the preceding figures, Fig. 5 is a detail view of a portion of the liner which receives the armor, Fig. 6 is a partial circumferential sectional view of a modified form of armor, Fig. 7 is a plan view of the armor shown in Fig. 6, Fig. 8 is a partial circumferential sectional view of a further modification, Fig. 9 is a plan view of the form of invention shown in Fig. 8.

Fig. 10 is a plan view of a portion of an armor adapted for larger size tires.

Fig. 11 is a cross sectional view taken on line 11—11 of Fig. 10.

Fig. 12 is a plan view of a pair of units similar to those shown in Fig. 10.

Fig. 13 is a cross sectional view of a tire casing having the invention embedded therein during its manufacture.

Fig. 14 is a partial circumferential sectional view showing the invention made in sections and overlapping one another, and Fig. 15 is a detail view of a unit similar to that shown in Fig. 4, but adapted for use with larger tires.

Referring more particularly to the drawings, and first to Figs. 1 to 5 inclusive which disclose the preferred embodiment of the invention, the numeral 1 indicates a pneumatic tire casing of usual construction, within which the inner tube 2 is confined. In this form of the invention the armor is interposed between the tire casing and inner tube and is held against circumferential and transverse movement by the pressure of the air within the inner tube. The armor per se comprises a plurality of units 3 of metal or similar material which will prevent foreign particles from penetrating the tire casing and puncturing the inner tube, and, when the casing becomes worn, reinforce same and prevent blow-outs.

As shown in the drawings each of the units 3 are made of relatively thin sheet metal and have their side edges turned back upon the body of the unit, as shown at 4, to provide a smooth edge which will prevent any possible cutting or abrading of the casing. If the units are made of some material other than metal, or if made from heavier metal for larger tires, as shown in Fig. 15, the side edges need not be turned back as the danger of cutting or abrading the casing will be materially lessened.

To provide means for connecting the various units together the ends thereof are turned back to form loops 5 for the reception of pintles 6 of the members 7, two of which are used to connect each member 3 to each adjacent member 7. Each of the members 7 is also formed of sheet metal, and each has two slots 8 and 9 of a length only slightly less than the width of the member. The slots 8, which have the pintles 6 defining one side thereof, are wider than the slots 9 and each receives one of the loops 5 formed on the ends of the units 3 and a strap 10 which forms the actual connecting means between the several units. The strap 10, which is made of rubberized fabric, leather or other flexible material is, as shown in Fig. 3, interlaced through the units 3 and members 7 so that it passes alternately over the outside and inside of said units.

As it is essential that the armor as a whole shall be puncture resisting at every point possible, the slots 8 and 9 of the members 7 are staggered with respect to each other so that it is impossible for a nail or other member to pass through the slots and puncture the inner tube. Should a nail find its way through the slot 9 of the outer member, it would be prevented from puncturing the inner tube by the body portion of the underlying inner member 7.

The structure already described comprises the puncture and blow-out resisting part of the armor. To further insure the protection of the inner tube against cuts or abrasions or from being pinched between the respective parts of the armor during relative movement between them, a protecting liner for the metallic parts of the armor is provided. This liner, like the strap 10, is formed of rubberized fabric or similar material and comprises a band 11 which extends across the outer portion of the inner tube beneath the metallic parts of the armor structure. The band 11 is considerably wider than the units 3 and extends around the inner tube a distance on each side of said units. Secured to the outer surface of the band 11, adjacent each side thereof, are a plurality of superposed strips 12 of gradually decreasing width. The strips 12 have their inner edges aligned, and as each superposed strip is of a width less than the subjacent strip, the edges of the superposed strips conform generally to the inner contour of the tire casing against which they bear. By having the inner edges of the strips 12 in alignment a recess 13 having straight side walls is provided into which the protecting portion of the armor is inserted.

When the assembled units 3 are placed in the recess 13 of the liner the outer contour of the assembled structure is of the same general shape as the inner contour of the tire casing, against which it is held without transverse movement by the pressure of the air within the inner tube. The tendency of the non-metallic strips 12 and the edges of the band 11 to cling to the tire casing further assures the structure being held in the proper place to intercept any foreign particle which might otherwise penetrate the casing and puncture the inner tube.

In Figs. 6 and 7 there is shown a modified form of the invention which is adapted to be used between the tire casing and inner tube the same as the form already described. The puncture and blow-out units 14 of this form of the invention comprise complementary plates 15, 16, which have their meeting edges interfitting and turned back to form loops 17 for the reception of pintles 18. By thus having each unit formed of two plates which are hinged together an armor is provided which is even more flexible than that shown in Figs. 1 to 5 inclusive. Each of the hinged plates 15 is provided with a slot 19 through which a strap 20 is interlaced so that it passes alternately on the outside and inside of the hinged units. A liner 11, as shown in Fig. 5 is also provided to prevent any possible damage to the inner tube.

In Figs. 8 and 9 there is shown an armor which is similar to that disclosed in Figs. 6 and 7, and which comprises hinged plates 21 and 22. However, the hinged plates in this form of the invention do not have interfitting edges, but the loops 23 for receiving the pintles are formed by bending back the entire adjacent edges of the plates which are of a width slightly less than the width of the plates, whereby a space 24 on each side of the units is left to receive the ends of the pintles 25 so that they will not protrude beyond the sides of the units. The pintles 25 is this form of the invention are, as shown in Fig. 9, made in the form of a wire loop 26.

While an armor comprising a single row of units will suffice for most pneumatic tires, it will be readily appreciated that for large size tires a single row of units may not be sufficient to afford the protection necessary. For such tires, armors as shown in Figs. 10, 11 and 12 are provided. These armors include a plurality of rows of the units 27 with their adjacent edges hinged together. In Fig. 10 there is shown a hinged connection similar to that disclosed by Fig. 9, while Fig. 12 shows a hinged connection like that of Figs. 7 and 8.

The protecting armor of this invention is primarily intended to be made independently of the tire and inserted within the casing as shown in Fig. 1. However, the invention also contemplates the use of such an armor as a permanent part of the tire casing. In such cases the armor without the liner may be embedded in the tread portion of the casing during its manufacture, as shown in Fig. 13. When the armor is to be thus embedded in the tread portion of the tire casing, the metallic units 3 are first secured to a strap 10 in any of the ways previously described and the assembled armor consisting of the strap and metal units is wrapped diagonally with a rubberized fabric 28 to prevent any possibility of the metal units abrading or cutting the tire casing.

It is also contemplated that in some instances the armor with the liner may be inserted within the casing, the same as in Fig. 1, and permanently secured in place by vulcanizing the same to the inner side of the tire casing.

It will also be obvious that, if desired, the armor may be made in overlapping sections as shown in Fig. 14. In this figure the liner is continuous and the assembled units are made in a plurality of overlapping sections.

From the aforegoing description, it will be seen that there has been provided an armor for pneumatic tires, which, without decreasing the resiliency of the tire or causing any damage thereto, will effectively prevent punctures and blow-outs, and thereby greatly prolong the life of the tire and relieve the motorist of the trouble and expense of making tire repairs.

What I claim is:

1. An armor for pneumatic tires comprising a plurality of puncture resisting units, separate slotted members connected to said units, and a strap interlaced through said slotted members and holding a plurality of said connected members and units in assembled relation.

2. An armor for pneumatic tires comprising a plurality of puncture resisting units, separate superposed slotted members connected to said units, and a strap interlaced through said slotted members and holding a plurality of said connected members and units in assembled relation.

3. An armor for pneumatic tires comprising a plurality of puncture resisting units, separate superposed slotted members connected to said units, the slots in said members being in non-alignment, and a strap interlaced through said non-aligned slots and holding a plurality of said members and units in assembled relation.

4. An armor for pneumatic tires comprising a plurality of puncture resisting units, said units having their ends turned to form loops, slotted members, between adjacent units, each slotted member having a portion thereof extending through a loop of one of said units, and a strap interlaced through said slotted members and holding a plurality of said members and units in assembled relation.

In testimony whereof I affix my signature.

ISRAEL BLOCK.